(12) United States Patent
Zhang et al.

(10) Patent No.: US 11,676,587 B2
(45) Date of Patent: Jun. 13, 2023

(54) METHOD, APPARATUS AND DEVICE FOR IMPLEMENTING VOICE APPLICATION, COMPUTER READABLE STORAGE MEDIUM

(71) Applicant: APOLLO INTELLIGENT CONNECTIVITY (BEIJING) TECHNOLOGY CO., LTD., Beijing (CN)

(72) Inventors: Long Zhang, Beijing (CN); Ye Song, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 359 days.

(21) Appl. No.: 16/794,188

(22) Filed: Feb. 18, 2020

(65) Prior Publication Data
US 2020/0273458 A1    Aug. 27, 2020

(30) Foreign Application Priority Data

Feb. 25, 2019 (CN) .......................... 201910137268.2

(51) Int. Cl.
| | | |
|---|---|---|
| G10L 15/22 | (2006.01) | |
| G06F 3/16 | (2006.01) | |
| G10L 15/18 | (2013.01) | |

(52) U.S. Cl.
CPC .............. *G10L 15/22* (2013.01); *G06F 3/167* (2013.01); *G10L 15/1815* (2013.01); *G10L 2015/221* (2013.01); *G10L 2015/225* (2013.01)

(58) Field of Classification Search
USPC ...................................... 704/1–504
See application file for complete search history.

(56) References Cited

U.S. PATENT DOCUMENTS 10,643,612 B2 * 5/2020 Wu .................... G10L 15/22
10,855,485 B1 * 12/2020 Zhou ................... G06F 40/40
(Continued)

FOREIGN PATENT DOCUMENTS

| | | |
|---|---|---|
| CN | 104077162 A | 10/2014 |
| CN | 108563475 A | 9/2018 |

(Continued)

OTHER PUBLICATIONS

First Office Action of the priority CN application.
(Continued)

*Primary Examiner* — Marcus T Riley
(74) *Attorney, Agent, or Firm* — J.C. Patents

(57) ABSTRACT

The present disclosure provides a method, an apparatus and a device for implementing a voice application and a computer readable storage medium, which determine a feedback content and a template identifier corresponding to a voice command of a user on a server side, and the determination result is performed by the IoT device. As the Internet information is iteratively updated, the voice command is also updated, the processing function of the voice command can be updated on the server side, so that the voice application in the IoT device does not need to be updated. Therefore, the processing capability of the voice application can be updated without upgrading the voice application itself, thereby alleviating the problem of an excessively long upgrade process due to the OTA upgrade process in the prior art.

10 Claims, 9 Drawing Sheets

(56) References Cited

U.S. PATENT DOCUMENTS

| | | | | |
|---|---|---|---|---|
| 10,909,331 B2* | 2/2021 | Peitz | ............... | G10L 15/1815 |
| 2010/0306154 A1* | 12/2010 | Poray | ............... | G06Q 30/02 |
| | | | | 707/E17.108 |
| 2011/0113041 A1* | 5/2011 | Hawthorne | ............ | G06Q 30/02 |
| | | | | 707/E17.108 |
| 2011/0271194 A1* | 11/2011 | Lin | ............... | G06Q 30/0241 |
| | | | | 715/728 |
| 2014/0196020 A1* | 7/2014 | Shetty | ............... | G06F 8/658 |
| | | | | 717/171 |
| 2017/0293740 A1* | 10/2017 | Xing | ............... | G06Q 10/10 |
| 2019/0295543 A1* | 9/2019 | Wu | ............... | H04L 67/306 |
| 2020/0273458 A1* | 8/2020 | Zhang | ............... | G06F 3/167 |

FOREIGN PATENT DOCUMENTS

| | | |
|---|---|---|
| CN | 109240673 A | 1/2019 |
| EP | 3179688 A1 | 6/2017 |

OTHER PUBLICATIONS

NPL: "Baidu Map Smart Voice Xiaodu User Guide", Jan. 22, 2018, Retrieved from the Internet: http://jingyan.baidu.com/article/67508eb40d13b09cca1ce41a.html.
First Office Action of the priority application CN201910137268.2.

\* cited by examiner

METHOD, APPARATUS AND DEVICE FOR IMPLEMENTING VOICE APPLICATION, COMPUTER READABLE STORAGE MEDIUM

CROSS-REFERENCE TO RELATED APPLICATION

This application claims priority to Chinese Patent Application No. 201910137268.2, filed on Feb. 25, 2019, which is incorporated by reference in its entirety.

TECHNICAL FIELD

The present disclosure relates to a voice application technology of an Internet of Things (IoT) device, and in particular, to a method, an apparatus and a device for implementing a voice application and a computer readable storage medium.

BACKGROUND

At present, with the development of the Internet of Things (IoT), many device entities can access the network, such as a vehicle, a smart speaker, etc. Through networking, applications in a physical device can be provided with more functions, and these applications can be upgraded and updated automatically based on the network.

In the prior art, an update method of an application installed in a vehicle or another access IoT physical device adopts an over-the-air technology (OTA) upgrade process. The inventors found that the solution in the prior art requires redeveloping a software even if very small changes occur in the application, and upgrades the software in an IoT device according to the new software; however, the OTA upgrade process is strict, resulting in an application upgrade in the IoT device that takes too long.

In this process, the stable operation of the updated IoT device application can be ensured. However, this process takes a long time. When functions of the IoT device application are updated frequently, a user cannot use new functions of the IoT device application in time. For example, the vehicle voice application often updates the semantic category. If the update method in the prior art is used, the iteration speed of the vehicle application far exceeds the update speed of the application, and the new functions of the vehicle application cannot be synchronized to the user end in time.

Therefore, the application of the IoT device in the prior art requires redeveloping the software when small changes occur, resulting in a long period of time for the user to use the new software function. Therefore, it is an urgent technical problem that needs to be solved by those skilled in the art to provide a new method for implementing the voice application, so that the application does not need to be redeveloped when small changes occur.

SUMMARY

The present disclosure provides a method, an apparatus and a device for implementing a voice application and a computer readable storage medium, so as to solve the problem that the voice application implementation solution in the prior art needs to adopt the OTA technology for upgrading, which results in an excessively long upgrade process.

A first aspect of the present disclosure is to provide a method for implementing a voice application, including:
sending, by an IoT device, a voice command of a user to a server;
receiving, by the IoT device, a feedback content and a target template identifier that are determined according to the voice command and sent by the server;
determining, by the IoT device, a target template according to the target template identifier, and determining, by the IoT device, a display content according to the target template and the feedback content; and
displaying, by the IoT device, the display content to the user.

A second aspect of the present disclosure is to provide a method for implementing a voice application, including:
receiving, by a server, a voice command sent by an IoT device;
determining, by the server, a target template identifier corresponding to the voice command based on a preset correspondence, and determining, by the server, a feedback content according to the voice command; and
sending, by the server, the feedback content and the target template identifier to the IoT device, so that the IoT device determines a display content to be displayed to a user according to the feedback content and the target template identifier.

A third aspect of the present disclosure is to provide an apparatus for implementing a voice application, including:
a sending module, configured to send a voice command of a user to a server;
a receiving module, configured to receive a feedback content and a target template identifier that are determined according to the voice command and sent by the server;
a determining module, configured to determine a target template according to the target template identifier, and determine a display content according to the target template and the feedback content; and
a display module, configured to display the display content to the user.

A fourth aspect of the present disclosure is to provide an apparatus for implementing a voice application, including:
a receiving module, configured to receive a voice command sent by an Internet of Things device;
a determining module, configured to determine a target template identifier corresponding to the voice command based on a preset correspondence, and determine a feedback content according to the voice command; and
a sending module, configured to send the feedback content and the target template identifier to the IoT device, so that the IoT device determines a display content to be displayed to a user according to the feedback content and the target template identifier.

Another aspect of the present disclosure is to provide a device for implementing a voice application, including:
a memory
a processor; and
a computer program;
where the computer program is stored in the memory and configured to be executed by the processor to implement the voice application implementation method of the first aspect or the second aspect described above.

Another aspect of the present disclosure is to provide a computer readable storage medium having stored a computer program thereon, which, when executed by a processor, implements the voice application implementation method according to the first aspect or the second aspect described above.

The technical effects of the method, the apparatus and the device for implementing the voice application, and the computer readable storage medium provided by the present disclosure areas follows.

The method, the apparatus and the device for implementing the voice application, and the computer readable storage medium include: sending, by an IoT device, a voice command of a user to a server; receiving, by the IoT device, a feedback content and a target template identifier that are determined according to the voice command and sent by the server; determining, by the IoT device, a target template according to the target template identifier, and determining, by the IoT device, a display content according to the target template and the feedback content; and displaying, by the IoT device, the display content to the user. The method, the apparatus and the device for implementing the voice application and the computer readable storage medium provided in the present disclosure determine the feedback content and the template identifier corresponding to a voice command of a user on a server side, and the determination result is performed by the IoT device. As the Internet information is iteratively updated, the voice command is also updated, the processing function for the voice command can be updated on the server side, so that the voice application in the IoT device does not need to be updated. Therefore, using the method, the apparatus and the device for implementing the voice application and the computer readable storage medium provided in the present disclosure, the processing capability of the voice application can be updated without upgrading the voice application itself, thereby alleviating the problem of an excessively long upgrade process due to the OTA upgrade process in the prior art.

DESCRIPTION OF EMBODIMENTS

In current IoT devices, many are provided with a voice application, such as smart speakers and vehicles capable of networking, etc. These IoT devices can process based on a voice command sent by a user and respond to the user, bringing good user experience. For a voice application, reacts to different user commands are different. As the update of Internet information, there will be more and more voice commands of a user. Therefore, there will also be more and more types of feedback, from a voice application, to a user. In this process, functions of the voice application need to be updated to meet user needs. If the implementation solution of the voice application in the prior art is adopted, the OTA technology is required to update the voice application, resulting in a long update process for the voice application, which prevents the user from using the new functions in the voice application in time.

In solutions provided by the present embodiments, there is a server configured to process a voice of a user, and to determine a specific content that responds to the user. At the same time, a template identifier for displaying the response content is determined according to the voice command. Correspondingly, templates are provided on the IoT device side. After the IoT device receives the content and the identifier sent by the server, a corresponding template can be determined based on the identifier, and then it can be displayed to the user based on the template and the content fed back by the server. Functions on the server side may be updated according to the update of the Internet information, so that the server can recognize more voice commands, and at the same time, a correspondence between the voice command and the template identifier in the server can be updated, so that the effect that the voice application has newly added functions can be achieved without updating the voice application in the IoT device.

Figure 1:
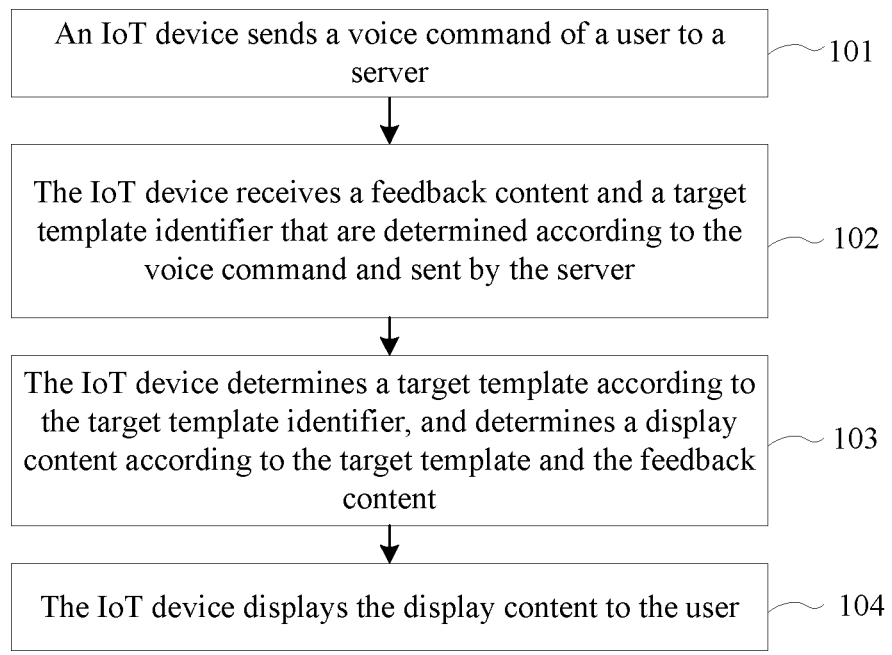
FIG. 1 is a flowchart of a method for implementing a voice application according to an exemplary embodiment of the present disclosure.

FIG. 1 is a flowchart of a method for implementing a voice application according to an exemplary embodiment of the present disclosure.

As shown in FIG. 1, the method for implementing the voice application provided by the present embodiment includes:

step 101, an IoT device sends a voice command of a user to a server.

The method provided in the present embodiment is performed by the IoT device, which is an electronic device with certain data processing capability and can be networked. In the IoT device, a voice application may be provided to execute the voice command sent by the user. The IoT device may be, for example, a vehicle, a speaker capable of networking, etc.

Specifically, the user can send a command to the IoT device by speaking, and can also turn on a voice function of the IoT device before sending the command. For example, when the IoT device is a vehicle, the user can press a voice function button inside the vehicle, and the button may be a virtual button or a physical button, thereby turning on the voice function inside the vehicle. Then the user can speak the command.

In an implementation, the IoT device can obtain the command sent by the user and then process the command to obtain a voice command, and then send the voice command to a server. In another implementation, the IoT device can also take the obtained command as the voice command and send the obtained command to the server directly.

Further, if the IoT device needs to process the command of the user, the IoT device may have a function of voice recognition. For example, a corresponding text content may be obtained based on the command of the user, and the text content may be used as the voice command. For another example, the command of the user may be processed to extract a key voice therein, and the key voice or a text content corresponding to the key voice may be used as the voice command. If the IoT device takes the command of the user as the voice command and sends the command of the user to the server directly, the IoT device may have a recording function. The IoT device may record the command spoken by the user and store it, and then send the stored recording to the server. The corresponding recording may also be deleted after the sending is completely.

In an actual application, the server may be an electronic device in a form of a computer, a distributed server group, or a cloud server, which is not limited in the present embodiment.

Step 102, the IoT device receives a feedback content and a target template identifier that are determined according to the voice command and sent by the server.

After receiving the voice command sent by the IoT device, the server can process the voice command and determine the feedback content.

If the voice command is the text content after the voice recognition by the IoT device, the server can perform analysis based on the voice command to determine the corresponding feedback content. For example, if the voice command is "What is the weather like today", the server can obtain weather information, which may be specifically queried by invoking a weather query interface. The feedback content may be considered as an answer or a response content obtained by the server based on the user command, and is used to respond to the user.

Specifically, the server has a networking function and can query required information on the Internet.

If the voice command received by the server is a user command directly sent by the IoT device, the server can perform voice recognition on the user command, determine its meaning, and then determine the corresponding feedback content.

Further, the server may further determine, according to the meaning of the voice command, a template identifier corresponding thereto. The server may extract a keyword in the voice command, and then determine the corresponding template identifier based on the keyword. For example, if the voice command is "What is the weather like today?", the server may extract a keyword "weather" therefrom and determine the template identifier corresponding to "weather".

In an actual application, the server may also determine a semantic category corresponding to the voice command according to the keyword, and set a correspondence between the semantic category and the template identifier on the server side, so as to determine the corresponding template identifier according to the semantic category. For example, if the voice command is "What is five plus three", the server may determine that the corresponding semantic category is "math", and correspondingly, the server may obtain the template identifier corresponding to "math".

After receiving the voice command, the server may determine the feedback content first, and may also determine the target template identifier first, and may also determine both the feedback content and the target template identifier at the same time, which is not limited in the present embodiment.

As the information is iterated, the semantic category may be increased accordingly. In this case, a new correspondence between the semantic category and the template identifier may be added on the server side.

Specifically, if there are many semantic categories, subclasses corresponding to the semantic category may be set. For example, the category math may further include a geometric subclass, an algebra subclass, etc. It may also be set as required. Correspondingly, each subclass may have a corresponding template identifier. In this implementation, the server may analyze the voice command and determine which subclass the voice command belongs, so as to determine the template identifier.

Further, a keyword corresponding to each category or subclass may be set, so that the server can determine the corresponding category or subclass based on the keyword.

In an actual application, after determining the feedback content and the target template identifier, the server may send it to the IoT device, so that the IoT device displays to the user according to the information fed back by the server.

Step 103, the IoT device determines a target template according to the target template identifier, and determines a display content according to the target template and the feedback content.

A template library for storing a template may be set in the IoT device, and at least the target template is stored in the template library. Moreover, the template has a corresponding template identifier that corresponds to the template identifier on the server side. For example, the server side is provided with a template identifier 1, then the template corresponding to the template identifier 1 is stored in the IoT device.

Specifically, the IoT device may determine a corresponding target template in the template library based on the target template identifier. In an implementation, the template in the target library may be named using the template identifier, then the IoT device can directly determine, in the template library, the template named using the target template identifier as the target template.

Further, after determining the target template, the IoT device can display, based on the target template, the feedback content sent by the server to the user.

In an actual application, multiple template elements may be set in the template, and relative positions of the template elements may be specified. For example, the template with the identifier of 1 is provided with a text element and a picture element, and the text element is set directly below the picture element; it may also specified that the size of the picture element may be automatically adjusted according to the picture in the feedback content, and the size of the text element may be automatically adjusted according to the text in the feedback content. For example, the text may fully fill the screen in the horizontal direction and be adjusted in the vertical direction based on the number of the text.

The IoT device may fill the feedback content into the target template, for example, placing the text content into the text element of the target template, and placing the picture content into the picture element of the target template to form the display content.

Specifically, the feedback content and the target template identifier are determined by the server based on the voice command, and therefore, the feedback content may be considered to match the target template. For example, the server may determine the type of an element required to be displayed according to the voice command, and then find the matching target template identifier, and may also integrate the feedback content to make it include the corresponding type of the element.

Further, the template may further include various template elements, such as audio, video, etc.

Step 104, the IoT device displays the display content to the user.

In an actual application, after determining the display content, the IoT device may display to the user through a display component in the device, and the display component refers to a component that can directly provide information to the user, such as a display component and a speaker component. The IoT device may invoke a corresponding component based on the specific content included in the display content, so that the corresponding component can display the display content.

If the display content includes a text and/or a picture content, the IoT device may invoke the display component to display the text and/or picture content. If the display content includes an audio content, the IoT device may invoke the speaker component, so that the speaker of the IoT device can play the audio. In addition, if the display content includes a video content, the IoT device may simultaneously invoke the display component and the speaker component for playing the video content. The component here may include software, and may further include a hardware, and the software may be considered as an interface capable of turning on the corresponding hardware, and the hardware may be a related hardware structure set in the IoT device.

Specifically, when the IoT device invokes the display component to display the content, it may be displayed based on a format in the target template. In the method provided in the present embodiment, the server determines the specific feedback content and the specific template identifier according to the voice command, and the IoT device displays according to the determination result of the server. In the implementation of the voice application provided in the present embodiment, it may update only the function of the server side after the voice command is updated. For example, the correspondence between the voice command and the template identifier is updated on the server side, so that the application on the IoT device side is not required to be updated, then the function of the voice application can be updated without adopting the OTA technology.

The method provided in the present embodiment is used to implement the voice application, and the method is performed by a device provided with the method according to the present embodiment, and the device is usually implemented in a hardware and/or software.

The method for implementing the voice application provided in the present embodiment includes: sending, by an IoT device, a voice command of a user to a server; receiving, by the IoT device, a feedback content and a target template identifier that are determined according to the voice command and sent by the server; determining, by the IoT device, a target template according to the target template identifier, and determining, by the IoT device, a display content according to the target template and the feedback content; and displaying, by the IoT device, the display content to the user. In the method for implementing the voice application provided by the present embodiment, the feedback content and the template identifier corresponding to the voice command of the user are determined on the server side, and the determination result is performed by the IoT device. As the Internet information is iteratively updated, the voice command is updated, then the processing function for the voice command can be updated on the server side, so that the voice application in the IoT device is not required to be updated. Therefore, using the method for implementing the voice application provided in the present embodiment, the processing capability of the voice application can be updated without upgrading the voice application itself, thereby alleviating the problem of an excessively long upgrade process due to the OTA upgrade process in the prior art.

Figure 2:
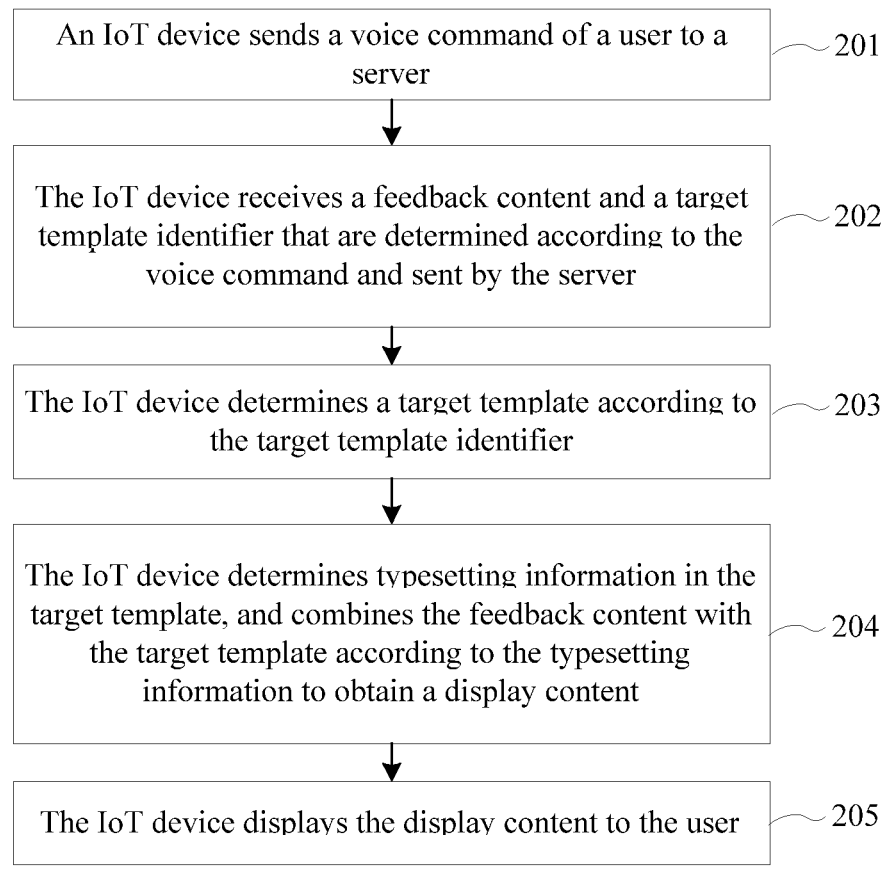
FIG. 2 is a flowchart of a method for implementing a voice application according to another exemplary embodiment of the present disclosure.

FIG. 2 is a flowchart of a method for implementing a voice application according to another exemplary embodiment of the present disclosure.

As shown in FIG. 2, the method for implementing the voice application provided in the present embodiment includes:

step 201, an IoT device sends a voice command of a user to a server;

step 202, the IoT device receives a feedback content and a target template identifier that are determined according to the voice command and sent by the server;

step 203, the IoT device determines a target template according to the target template identifier.

The specific principles and implementations of step 201 to step 203 are similar to that of steps 101 to 103, which will not be repeated herein.

The target template includes a generic template in a Html5 format. The IoT device is provided with a generic template. Correspondingly, an identifier corresponding to the generic template is set on the server side. When the target template identifier that is determined based on the voice command on the server side is the identifier of the generic template, the IoT device may display the feedback content to the user according to the stored generic template.

Specifically, a plurality of template elements, such as a text, a picture, an audio and a video, may be placed in the generic template in the Html5 format. When the voice function is updated on the server side, and there is no suitable template corresponding to the new voice function, the generic template may be used as the target template, so that the IoT device displays the feedback content using the generic template. The manner provided by the present embodiment can further alleviate the problem that the application is required to be updated on the IoT device side.

Step 204, the IoT device determines typesetting information in the target template, and combines the feedback content with the target template according to the typesetting information to obtain a display content.

Further, after determining the target template, the IoT device may read the typesetting information in the target template. In the present embodiment, the typesetting information may include a template element and a relative position. For example, a template with an identifier of 1 may include only one text element; a template with an identifier of 2 may include a text element and a picture element, where the text element may be set below the picture element. Of course, a template with a more complicated display effect may be set as required, which will not be limited in the present embodiment.

In an actual application, the IoT device may combine the feedback content into the target template according to the typesetting information, thereby obtaining the display content. For example, the IoT device may place the text part of the feedback content into the text element of the target template, and may also place the picture part of the feedback content into the picture element of the target template.

Optionally, in the generic template, the feedback content may be listed without excessive attention to the relative position. For example, the picture content may be placed before the text content, or the picture content may be placed after the text content, or may further be placed in the general template based on the order in which the feedback content is received. Since the generic template is in the Html5 format, a plurality of existing multimedia elements (template elements) may be placed therein. Html5 is the fifth major revision of an application of Hypertext Markup Language (HTML) under the core language of the World Wide Web and the standard universal markup language (this is a recommended standard, which is called W3C Recommendation).

The feedback content sent by the server to the IoT device may include at least one of the following:

a text content, a picture content, an audio content or a navigation content.

Specifically, the text content and the picture content may be displayed on the display of the IoT device for the user to watch, the audio content may be played through the speaker of the IoT device, and the navigation content may be displayed through both of the display and the speaker.

Step 205, the IoT device displays the display content to the user.

If the feedback content includes the text content and/or picture content, the IoT device may invoke a display interface to cause a display component of the IoT device to display the text content and/or the picture content.

If the feedback content includes the audio content, the IoT device may invoke an audio interface to cause a speaker component of the IoT device to play the audio content.

If the feedback content includes the navigation content, the IoT device may invoke a navigation interface to cause a navigation component of the IoT device to display a route corresponding to the navigation content.

Specifically, the IoT device may determine the content specifically included in the feedback content according to the feedback content itself, and may also determine the form of the feedback content that needs to be displayed according to the template element included in the target template, and invoke the corresponding interface based on the determination result.

Further, in the method provided in the present embodiment, the interface may be configured to control the related hardware, for example, the display interface may be used to turn on the display component in the IoT device, and the display component may be a display. The audio interface may be used to turn the speaker component in the IoT device, and the speaker component may be a built-in speaker of the IoT device. The navigation interface may be used to turn on the navigation component in the IoT device, which may include, for example, a display for displaying the route, a positioning module for obtaining the location of the IoT device in real time, and a speaker module for prompting the user of the route by voice.

In an actual application, in the method provided by the present embodiment, the IoT device may determine a display manner based on the feedback content and/or the target template determined by the server, and invoke the corresponding interface, thereby turning on the relevant hardware component and can display to the user from a plurality of sensory perspectives.

The method provided in the present embodiment may further include a step of updating an internal template of the IoT device. When the voice function is updated on the server side and there is no template matching the voice command, the IoT device may be instructed to use the generic template to display. However, since the visual effect of the generic template is not as good as that of other templates, for better display to the user, the template inside the IoT device may be updated to adapt to the updated voice function in the server, and accordingly, an identifier corresponding to the updated template in the Internet of Things is provided in the server.

Figure 2A:
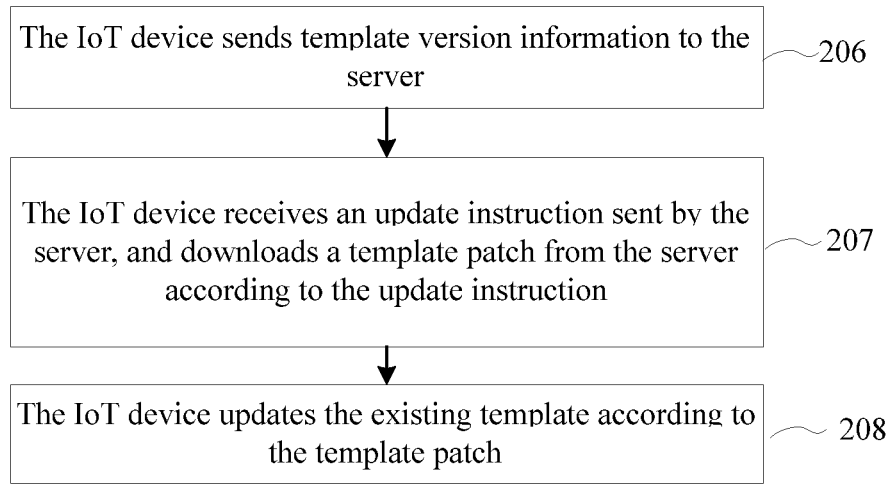
FIG. 2A is a flowchart of a template update method according to an exemplary embodiment of the present disclosure.

FIG. 2A is a flowchart of a template update method according to an exemplary embodiment of the present disclosure.

As shown in FIG. 2A, the template update method provided in the present embodiment includes:

step 206, the IoT device sends template version information to the server;

step 207, the IoT device receives an update instruction sent by the server, and downloads a template patch from the server according to the update instruction; and step 208, the IoT device updates the existing template according to the template patch.

The template update method provided in the present embodiment may be combined with the method shown in FIG. 1 or FIG. 2, and the specific execution sequence thereof is not limited. For example, in the embodiment of FIG. 2, step 206 to step 208 may be performed before step 201 in the embodiment shown in FIG. 2, and step 206 to step 208 may also be performed after step 205 in the embodiment shown in FIG. 2, and step 206 to step 208 may also be performed in the steps of the embodiment shown in FIG. 2. For example, in step 201, when the IoT device sends the voice command to the server, step 206 may also be performed simultaneously, that is, performing the sending the template version information to the server. In step 202, the IoT device may also receive the update instruction sent by the server and download the patch while receiving the feedback content and the target template identifier, and the step 203 may be performed after step 208, that is, after the patch is updated. In addition, there may be other ways to combine the embodiment shown in FIG. 2A with the above embodiments.

Specifically, the template version information may be stored in the IoT device, for example, template 1.0, template 2.0, etc. The IoT device may read the version information stored internally and send it to the server, so that after receiving the template version information, the server can compare it with the latest template version information to determine whether the template in the IoT device needs to be updated.

Further, a developer may develop a new template based on the requirement, set a corresponding template identifier to be stored on the server side, and update the template in the IoT device based on the method provided in the present embodiment; or the template and the corresponding template identifier thereof on the server side may be automatically generated, and the template in the IoT device is updated based on the method provided in the present embodiment. The server side may store the latest template version information. For example, the current template version is 1.0, multiple templates are newly developed based on the requirement of information iteration, then a combination of these new templates and the original template may be considered as version 2.0.

In an actual application, if the server judges that the template version information in the IoT device is lower than the latest version information, then the server may send the update instruction to the IoT device to instruct the IoT device to update the template.

After receiving the update instruction, the IoT device may initiate an update request to the server to update the template. After receiving the update request, the server may determine the template patch according to the version information sent by the IoT device and the latest template version information, and send the template patch to the IoT device. The server may only package the templates with difference between versions as patches and send them to the IoT device. For example, the current template version in the server is 2.0, the version in the IoT device is 1.0, the difference between such two versions is that version 2.0 has 10 new templates more than version 1.0, then the server may package the 10 templates as patches and send them to the IoT device. In addition, after updating the template to be the new template, the server may also generate a patch package based on the current version information and the historical version information, so as to obtain directly the corresponding patch package and send it after receiving the update request.

Specifically, after downloading the template patch, the IoT device may scan the patch package to update the existing template. In specific situations, the IoT device may also scan for patches that are not installed, so as to achieve the update of the patch. For example, scanning may be performed for patches that need to be installed each time it is turned on or restarted.

Figure 2B:
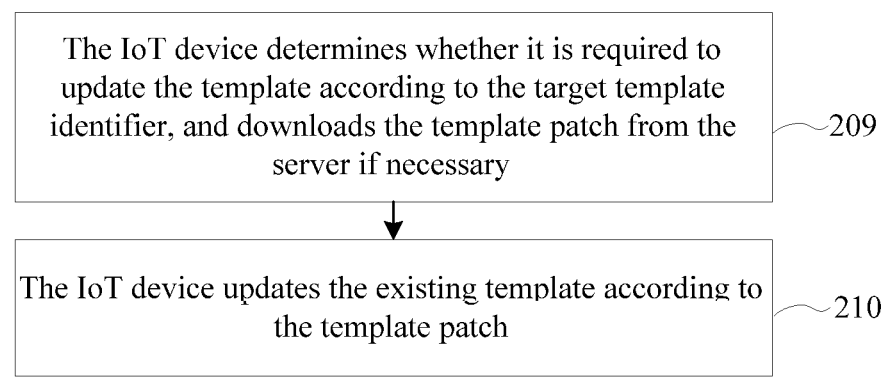
FIG. 2B is a flowchart of a template update method according to another exemplary embodiment of the present disclosure.

FIG. 2B is a flowchart of a template update method according to another exemplary embodiment of the present disclosure.

As shown in FIG. 2B, the template update method provided in the present embodiment includes:

step 209, the IoT device determines whether it is required to update the template according to the target template identifier, and downloads the template patch from the server if necessary;

step 210, the IoT device updates the existing template according to the template patch.

The template update method provided in the present embodiment may be combined with the method shown in FIG. 1 or FIG. 2. For example, when it is combined with the method shown in FIG. 1, step 209 to step 210 may be performed after step 102, and step 103 may be performed after step 210. For example, when it is combined with the method shown in FIG. 2, step 209 to step 210 may be performed after step 202, and step 203 may be performed after step 210.

The IoT device may judge whether the corresponding target template is stored internally after receiving the target template identifier. If not, it may be determined that the template needs to be updated. After determining that the template needs to be updated, the IoT device may download the template patch from the server. Specifically, the update request may be sent to the server, so that the server sends the template patch to the IoT device, which is similar to the embodiment shown in FIG. 2A, which will not be repeated herein.

The implementation principle and function of step 210 are similar with that of step 208, which will not be repeated herein.

In the method provided in the present embodiment, a template update mechanism is further provided, and the template update mode does not need to update the voice application itself in the IoT device, but updates in the form of patches, so that the voice application can have the new voice function without taking too long.

In addition, if the updated template involves invoking a new interface, the template patch may further include an interface patch, so that the IoT device updates the existing interface while updating the template, and then enable invoking the corresponding interface while using the new template.

Figure 3:
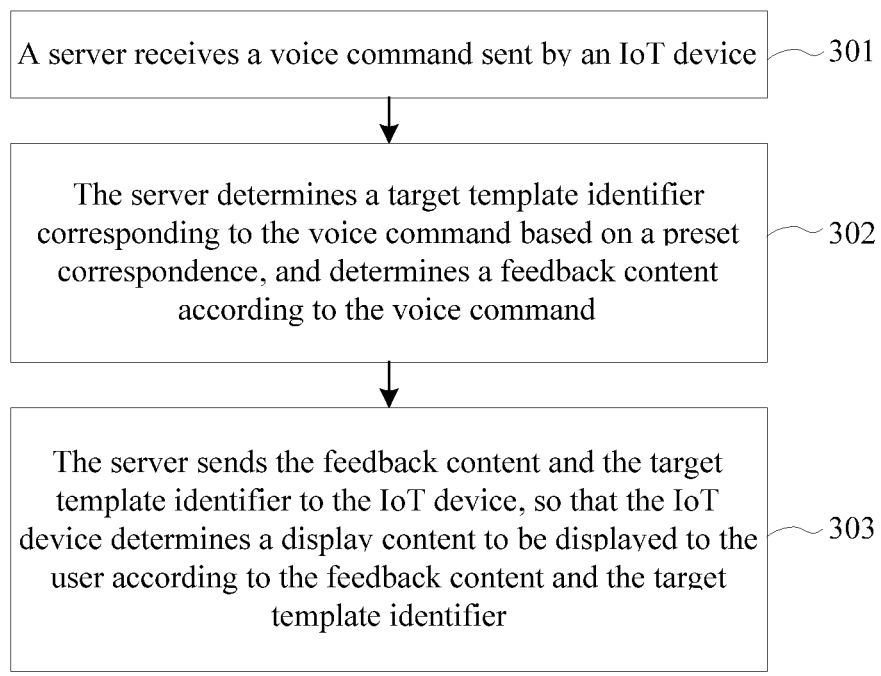
FIG. 3 is a flowchart of a method for implementing a voice application according to another exemplary embodiment of the present disclosure.

FIG. 3 is a flowchart of a method for implementing a voice application according to another exemplary embodiment of the present disclosure.

As shown in FIG. 3, the method for implementing the voice application provided in the present embodiment includes:

step 301, a server receives a voice command sent by an IoT device.

The method provided in the present embodiment is performed by the server, and the server is used to support related functions of a voice application in the IoT device. The server may be an electronic device in the form of a computer, and may also be a distributed server group or a cloud server, which will not be limited in the present embodiment.

The IoT device is an electronic device with certain data processing capability and can be networked. In the IoT device, a voice application may be provided to execute the voice command sent by the user. The IoT device may be, for example, a vehicle, a speaker capable of networking, etc.

Specifically, the user can send a command to the IoT device by speaking, and can also turn on a voice function of the IoT device before sending the command. For example, when the IoT device is a vehicle, the user can press a voice function button inside the vehicle, and the button may be a virtual button or a physical button, thereby turning on the voice function inside the vehicle. Then the user can speak the command.

In an implementation, the IoT device can obtain the command sent by the user and then process the command to obtain a voice command, and then send the voice command to a server. In another implementation, the IoT device can also take the obtained command as the voice command and send the obtained command to the server directly. That is, the voice command received by the server may be the processed data information, or a directly obtained command.

Further, if the IoT device needs to process the command of the user, the IoT device may have a function of voice recognition. For example, a corresponding text content may be obtained based on the command of the user, and the text content may be used as the voice command. For another example, the command of the user may be processed to extract a key voice therein, and the key voice or a text content corresponding to the key voice may be used as the voice command. If the IoT device takes the command of the user as the voice command and sends the command of the user to the server directly, the IoT device may have a recording function. The IoT device may record the command spoken by the user and store it, and then send the stored recording to the server. The corresponding recording may also be deleted after the sending is completely.

Step 302, the server determines a target template identifier corresponding to the voice command based on a preset correspondence, and determines a feedback content according to the voice command.

After receiving the voice command sent by the IoT device, the server can process the voice command and determine the feedback content.

If the voice command is the text content after the voice recognition by the IoT device, the server can perform analysis based on the voice command to determine the corresponding feedback content. For example, if the voice command is "What is the weather like today", the server can obtain the weather information, which may be specifically queried by invoking a weather query interface. The feedback content may be considered as an answer or a response content obtained by the server based on the user command, and is used to respond to the user.

Specifically, the server has a networking function and can query required information on the Internet.

If the voice command received by the server is a user command directly sent by the IoT device, the server can perform voice recognition on the user command, determine its meaning, and then determine the corresponding feedback content.

Further, the server may further determine, according to the preset correspondence, the template identifier corresponding to the voice command. The preset correspondence may be stored in the server, for example, may be a correspondence between a keyword and the template identifier. For example, the server may extract a keyword in the voice command, and then determine the corresponding template identifier based on the keyword. For example, if the voice command is "What is the weather like today?", the server may extract a keyword "weather" therefrom and determine the template identifier corresponding to "weather".

In an actual application, the preset correspondence may also be a correspondence between a semantic category and the template identifier. In this implementation, the server may also determine the semantic category corresponding to the voice command, so as to determine the corresponding template identifier according to the semantic category. For example, the semantic category may be determined based on the keyword in the voice command. If the voice command is "What is five plus three", the server may determine that the corresponding semantic category is "math", and correspondingly, the server may obtain the template identifier corresponding to "math".

After receiving the voice command, the server may determine the feedback content first, and may also determine the target template identifier first, and may also determine both the feedback content and the target template identifier at the same time, which is not limited in the present embodiment.

As the information is iterated, the semantic category may be increased accordingly. In this case, a new correspondence between the semantic category and the template identifier may be added on the server side.

Specifically, if there are many semantic categories, subclasses corresponding to the semantic category may be set. For example, the category math may further include a geometric subclass, an algebra subclass, etc. It may also be set as required. Correspondingly, each subclass may have a corresponding template identifier. In this implementation, the server may analyze the voice command and determine which subclass the voice command belongs, so as to determine the template identifier.

Further, a keyword corresponding to each category or subclass may be set, so that the server can determine the corresponding category or subclass based on the keyword.

Step 303, the server sends the feedback content and the target template identifier to the IoT device, so that the IoT device determines a display content to be displayed to the user according to the feedback content and the target template identifier.

In an actual application, after determining the feedback content and the target template identifier, the server may send it to the IoT device, so that the IoT device displays to the user according to the information fed back by the server.

A template library for storing a template may be set in the IoT device, and at least the target template is stored in the template library. Moreover, the template has a corresponding template identifier that corresponds to the template identifier on the server side. For example, the server side is provided with a template identifier 1, then the template corresponding to the template identifier 1 is stored in the IoT device.

Specifically, the IoT device may determine a corresponding target template in the template library based on the target template identifier. After determining the target template, the IoT device can display, based on the target template, the feedback content sent by the server to the user.

In an actual application, multiple template elements may be set in the template, and relative positions of the template elements may be specified. For example, the template with the identifier of 1 is provided with a text element and a picture element, it may also specified that the size of the picture element may be automatically adjusted according to the picture in the feedback content, and the size of the text element may be automatically adjusted according to the text in the feedback content. For example, the text may fully fill the screen in the horizontal direction and be adjusted in the vertical direction based on the number of the text.

The IoT device may fill the feedback content into the target template, for example, placing the text content into the text element of the target template, and placing the picture content into the picture element of the target template to form the display content.

Specifically, the feedback content and the target template identifier are determined by the server based on the voice command, and therefore, the feedback content may be considered to match the target template. For example, the server may determine the type of element required to be displayed according to the voice command, and then find the matching target template identifier, and may also integrate the feedback content to make it include the corresponding type of the element.

In an actual application, after determining the display content, the IoT device may display to the user through a display component in the device, and the display component refers to a component that can directly provide information to the user, such as a display component and a speaker component. The IoT device may invoke a corresponding component based on the specific content included in the presentation content, so that the corresponding component can display the display content.

If the display content includes a text and/or a picture content, the IoT device may invoke the display component to display the text and/or picture content, If the display content includes an audio content, the IoT device may invoke the speaker component, so that the speaker of the IoT device can play the audio. In addition, if the display content includes a video content, the IoT device may simultaneously invoke the display component and the speaker component for playing the video content. The component here may include software, and may further include a hardware, and the software may be considered as an interface capable of turning on the corresponding hardware, and the hardware may be a related hardware structure set in the IoT device.

Specifically, when the IoT device invokes the display component to display the content, it may be displayed based on a format in the target template. In the method provided in the present embodiment, the server determines the specific feedback content and the specific template identifier according to the voice command, and the IoT device displays according to the determination result of the server. In the implementation of the voice application provided in the present embodiment, it may update only the function of the server side after the voice command is updated. For example, the correspondence between the voice command and the template identifier is updated on the server side, so that the application on the IoT device side is not required to be updated, then the function of the voice application can be updated without adopting the OTA technology.

The method provided in the present embodiment is used to implement the voice application, and the method is performed by a device provided with the method according to the present embodiment, and the device is usually implemented in a hardware and/or software.

The method for implementing the voice application provided in the present embodiment includes: receiving, by the server, a voice command sent by the IoT device; determining, by the server, a target template identifier corresponding to the voice command based on a preset correspondence, and determining, by the server, a feedback content according to the voice command; sending, by the server, the feedback content and the target template identifier to the IoT device, so that the IoT device determines a display content to be displayed to the user according to the feedback content and the target template identifier. In the method for implementing the voice application provided in the present embodiment, the feedback content and the template identifier corresponding to the voice command of the user are determined on the server side, and the determination result is performed by the IoT device. As the Internet information is iteratively updated, the voice command is updated, then the processing function for the voice command can be updated on the server side, so that the voice application in the IoT device is not required to be updated. Therefore, using the method for implementing the voice application provided in the present embodiment, the processing capability of the voice application can be updated without upgrading the voice application itself, thereby alleviating the problem of an excessively long upgrade process due to the OTA upgrade process in the prior art.

Figure 4:
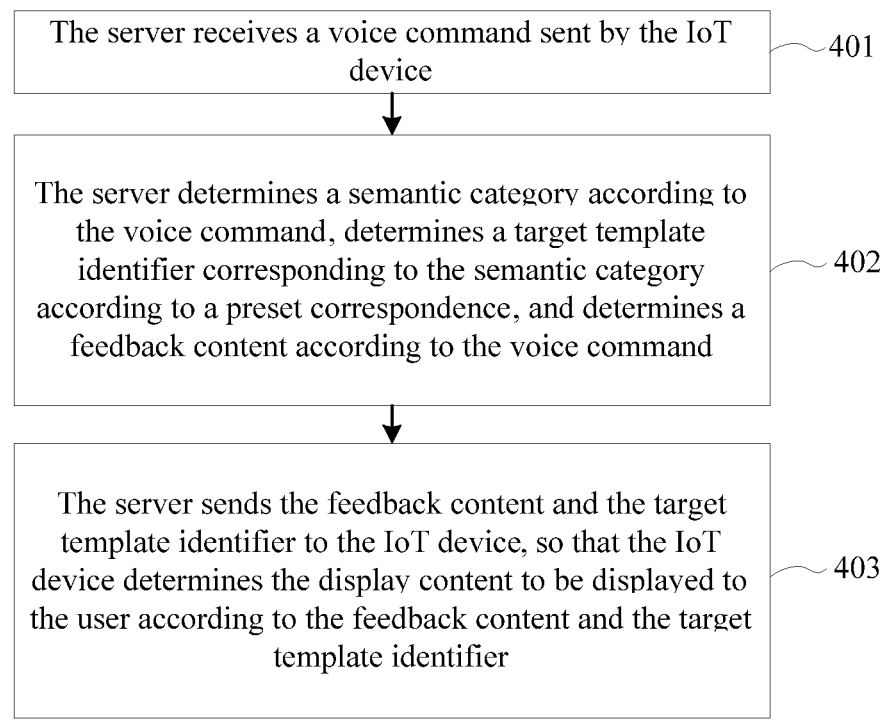
FIG. 4 is a flowchart of a method for implementing a voice application according to another exemplary embodiment of the present disclosure.

FIG. 4 is a flowchart of a method for implementing a voice application according to another exemplary embodiment of the present disclosure.

As shown in FIG. 4, the method for implementing the voice application provided in the present embodiment includes:

step 401, the server receives a voice command sent by the IoT device.

The specific principle and implementation of step 401 are similar to that of step 301, which will not be repeated herein.

Step 402, the server determines a semantic category according to the voice command, determines a target template identifier corresponding to the semantic category according to a preset correspondence, and determines a feedback content according to the voice command.

The manner of determining the feedback content in this step is similar to that in step 302, which will not be repeated herein.

The feedback content includes at least one of the following:

a text content, a picture content, an audio content or a navigation content.

Specifically, the text content and the picture content may be displayed on the display of the IoT device for the user to watch, the audio content may be played through the speaker of the IoT device, and the navigation content may be displayed through both of the display and the speaker.

In the method provided in the present embodiment, the server can determine the voice category according to the voice command, and set the preset correspondence between the semantic category and the target template identifier.

Specifically, the server may extract a keyword in the voice command, and determine the semantic category according to the extracted keyword. For example, the semantic category may be determined based on the keyword in the voice command. Assuming that the voice command is "What is five plus three", then the server may determine that the corresponding semantic category is "math".

Further, a semantic recognition model may be set in the server, the model may be obtained based on neural network training, and a voice command may be input into the model, so that the model outputs the semantic category.

After determining the semantic category, the server may determine the target template identifier corresponding to the semantic category based on the preset correspondence.

Step 403, the server sends the feedback content and the target template identifier to the IoT device, so that the IoT device determines the display content to be displayed to the user according to the feedback content and the target template identifier.

The specific principle and implementation of step 403 are similar to that of step 303, which will not be repeated herein.

The method provided in the present embodiment may further include a step of updating an internal template of the IoT device. When the voice function is updated on the server side and there is no template matching the voice command, the IoT device may be instructed to use the generic template to display. However, the visual effect of the generic template is not as good as that of other templates, for better display to the user, the template inside the IoT device may be updated to adapt to the updated voice function in the server, and accordingly, an identifier corresponding to the updated template in the Internet of Things is provided in the server.

Figure 4A:
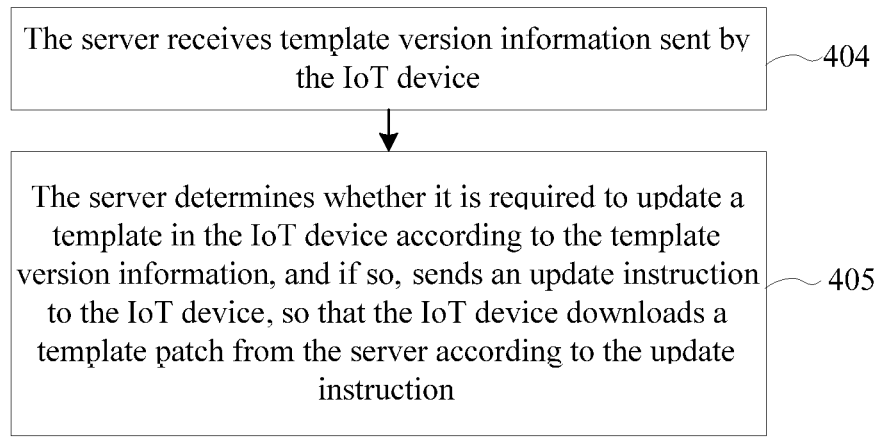
FIG. 4A is a flowchart of a template update method according to another exemplary embodiment of the present disclosure.

FIG. 4A is a flowchart of a template update method according to another exemplary embodiment of the present disclosure.

As shown in FIG. 4A, the template update method provided in the present embodiment includes:

step 404, the server receives template version information sent by the IoT device; and step 405, the server determines whether it is required to update a template in the IoT device according to the template version information, and if so, sends an update instruction to the IoT device, so that the IoT device downloads a template patch from the server according to the update instruction.

The template update method provided in the present embodiment may be combined with the method shown in FIG. 3 or FIG. 4, and the specific execution sequence thereof is not limited. For example, in the embodiment of FIG. 4, when the IoT device sends the voice command to the server, the template version information may be sent at the same time. Therefore, the server may further perform step 404 when performing step 401, and perform step 405 after performing step 404. If it is determined that the IoT device needs to update the template, the update instruction may be sent when the feedback content and the target template identifier are sent to the IoT device.

Specifically, the template version information may be stored in the IoT device, for example, template 1.0, template 2.0, etc. The IoT device may read the version information stored internally and send it to the server so that the server receives the template version information.

After receiving the template version information, the server can compare it with the latest template version information to determine whether the template in the IoT device needs to be updated.

Further, a developer may develop a new template based on the requirement, set a corresponding template identifier to be stored on the server side, and update the template in the IoT device based on the method provided in the present embodiment; or the template and the corresponding template identifier thereof on the server side may be automatically generated, and the template in the IoT device is updated based on the method provided in the present embodiment. The server side may store the latest template version information. For example, the current template version is 1.0, multiple templates are newly developed based on requirement of the information iteration, then a combination of these new templates and the original template may be considered as version 2.0.

In an actual application, if the server judges that the template version information in the IoT device is lower than the latest version information, then the server may send the update instruction to the IoT device to instruct the IoT device to update the template.

After receiving the update instruction, the IoT device may initiate an update request to the server to update the template. After receiving the update request, the server may determine the template patch according to the version information sent by the IoT device and the latest template version information, and send the template patch to the IoT device. The server may only package the templates with difference between versions as patches and send them to the IoT device. For example, the current template version in the server is 2.0, the version in the IoT device is 1.0, the difference between such two versions is that version 2.0 has 10 new templates more than version 1.0, then the server may package the 10 templates as patches and send them to the IoT device. In addition, after updating the template to be the new template, the server may also generate a patch package based on the current version information and the historical version information, so as to obtain directly the corresponding patch package and send it after receiving the update request.

Specifically, after downloading the template patch, the IoT device may scan the patch package to update the existing template. In specific situations, the IoT device may also scan for patches that are not installed, so as to achieve the update of the patch. For example, scanning may be performed for patches that need to be installed each time it is turned on or restarted.

Figure 4B:
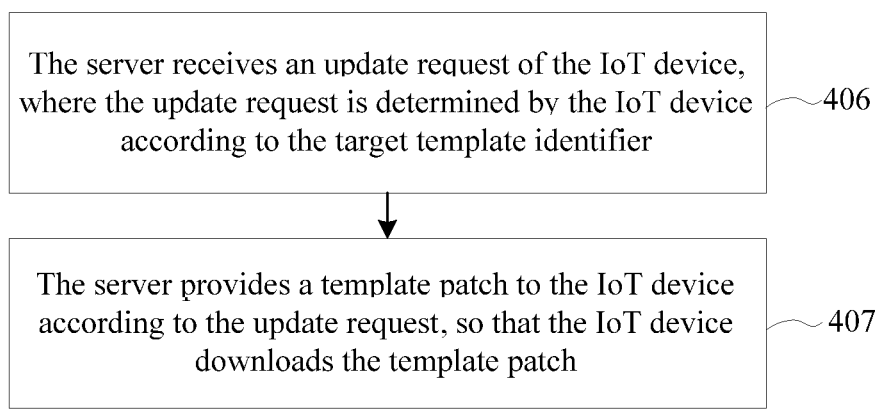
FIG. 4B is a flowchart of a template update method according to another exemplary embodiment of the present disclosure.

FIG. 4B is a flowchart of a template update method according to another exemplary embodiment of the present disclosure.

As shown in FIG. 4B, the template update method provided in the present embodiment includes:

step 406, the server receives an update request of the IoT device, where the update request is determined by the IoT device according to the target template identifier; and step 407, the server provides a template patch to the IoT device according to the update request, so that the IoT device downloads the template patch.

The template update method provided in the present embodiment may be combined with the method shown in FIG. 3 or FIG. 4. For example, when it is combined with the method shown in FIG. 3, the IoT device may determine, after receiving the target template identifier, whether the template needs to be updated based on the target template identifier. If so, the update request is sent to the server to cause the server to perform step 406 to step 407. The server may perform step 407 while performing step 303, that is, the feedback content, the target template identifier and the patch are sent to the IoT device at the same time, or may be sent separately, which will not be limited in the present embodiment.

The IoT device may judge whether the corresponding target template is stored internally after receiving the target template identifier. If not, it may be determined that the template needs to be updated. After determining that the template needs to be updated, the IoT device may download the template patch from the server. Specifically, the update request may be sent to the server, so that the server sends the template patch to the IoT device.

The update request may further include version information stored in the IoT device, that is, the current template version information of the IoT device. After receiving the update request, the server may determine the template patch according to the version information sent by the IoT device and the latest template version information, and then send the template patch to the IoT device. The server may only package the templates with difference between versions as patches and send them to the IoT device. For example, the current template version in the server is 2.0, the version in the IoT device is 1.0, the difference between such two versions is that version 2.0 has 10 new templates more than version 1.0, then the server may package the 10 templates as patches and send them to the IoT device. In addition, after updating the template to be the new template, the server may also generate a patch package based on the current version information and the historical version information, so as to obtain the corresponding patch package and send it after receiving the update request.

Specifically, after downloading the template patch, the IoT device may scan the patch package to update the existing template. In specific situations, the IoT device may also scan for patches that are not installed, so as to achieve the update of the patch. For example, scanning may be performed for patches that need to be installed each time it is turned on or restarted.

In the method provided in the present embodiment, a template update mechanism is further provided, and the template update mode does not need to update the voice application itself in the IoT device, but updates in the form of patches, so that the voice application may have the new voice function but does not take a long time.

In addition, in the method provided in the present embodiment, the server may further receive a relationship update instruction, and update the preset correspondence according to the relationship update instruction.

The relationship update instruction may be sent by other electronic device to the server, or be sent by the developer to the server through an external device of the server. This allows the server to update its existing preset correspondence. For example, after adding a new semantic category, a template corresponding to the semantic category may be determined in an existing template, that is, a correspondence between the new semantic category and the template is determined, and the existing preset correspondence may be updated according to the determined new correspondence. In this process, there is no need to update the voice application in the IoT device. When the voice command of the user belongs to a new semantic category, the server may make a judgment and determine the target template for display, thereby enabling the IoT device to display based on the new semantic category. That is, the IoT device has the function of recognizing the voice command belonging to a new semantic category without updating the voice application itself.

In addition, if the updated template involves invoking a new interface, the template patch provided by the server to the IoT device may further include an interface patch, so that the IoT device updates the existing interface while updating the template, and then enable invoking the corresponding interface when using the new template.

Figure 5:
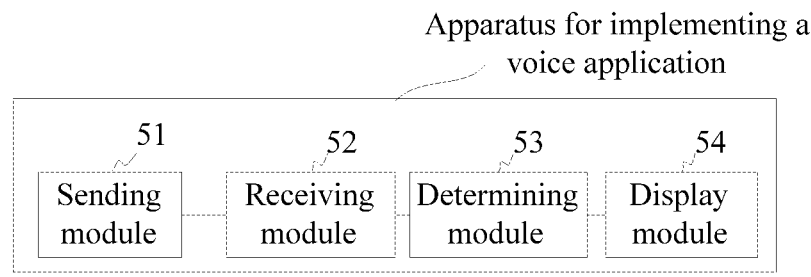
FIG. 5 is a structural diagram of an apparatus for implementing a voice application according to an exemplary embodiment of the present disclosure.

FIG. 5 is a structural diagram of an apparatus for implementing a voice application according to an exemplary embodiment of the present disclosure.

As shown in FIG. 5, the apparatus for implementing the voice application provided in the present embodiment includes:

a sending module 51, configured to send a voice command of a user to a server;

a receiving module 52, configured to receive a feedback content and a target template identifier that are determined according to the voice command and sent by the server;

a determining module 53, configured to determine a target template according to the target template identifier, and determine a display content according to the target template and the feedback content;

a display module 54, configured to display the display content to the user.

The apparatus for implementing the voice application provided in the embodiment includes: a sending module, configured to send a voice command of a user to a server; a receiving module, configured to receive a feedback content and a target template identifier that are determined according to the voice command and sent by the server; a determining module, configured to determine a target template according to the target template identifier, and determine a display content according to the target template and the feedback content; and a display module, configured to display the display content to the user. The apparatus for implementing the voice application provided in the present embodiment determines the feedback content and the template identifier corresponding to the voice command of a user on the server side, and the determination result is performed by the IoT device. As the Internet information is iteratively updated, the voice command is also updated, the processing function for the voice command can be updated on the server side, so that the voice application in the IoT device does not need to be updated. Therefore, using the apparatus for implementing the voice application provided in the present embodiment, the processing capability of the voice application can be updated without upgrading the voice application itself, thereby alleviating the problem of an excessively long upgrade process due to the OTA upgrade process in the prior art.

The specific principle and implementation of the apparatus for implementing the voice application provided in the present embodiment are similar to that of the embodiment shown in FIG. 1, which will not be repeated herein.

Figure 6:
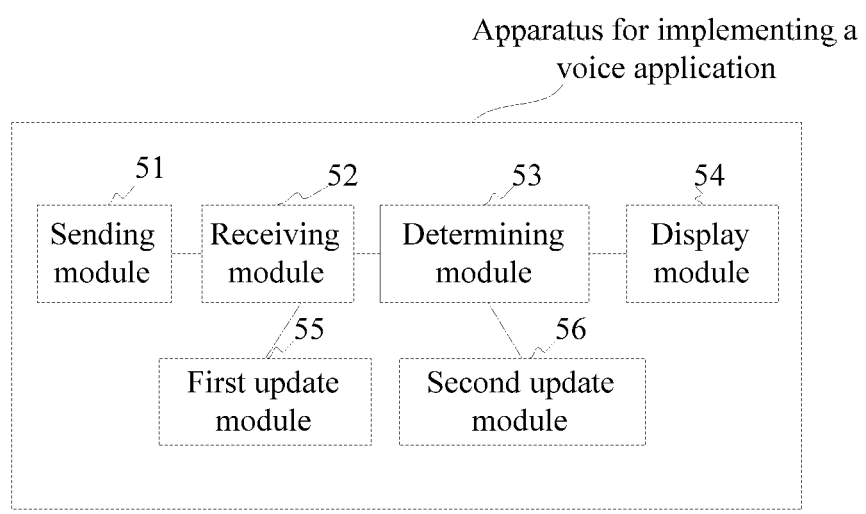
FIG. 6 is a structural diagram of an apparatus for implementing a voice application according to another exemplary embodiment of the present disclosure.

FIG. 6 is a structural diagram of an apparatus for implementing a voice application according to another exemplary embodiment of the present disclosure.

As shown in FIG. 6, on the basis of the foregoing embodiment, in the apparatus for implementing the voice application provided in the present embodiment, optionally, the target template includes a generic template in a Html5 format.

Optionally, the determining module 53 is specifically configured to:

determine typesetting information in the target template, and combine the feedback content with the target template according to the typesetting information to obtain the display content.

Optionally, the feedback content includes at least one of the following:

a text content, a picture content, an audio content or a navigation content.

Optionally, if the feedback content includes the text content and/or the picture content, the display module 54 is specifically configured to:

invoke a display interface to cause a display component to display the text content and/or the picture content;

if the feedback content includes the audio content, the display module 54 is specifically configured to:

invoke an audio interface to cause a speaker component to play the audio content;

if the feedback content includes the navigation content, the display module 54 is specifically configured to:

invoke a navigation interface to cause a navigation component to display a route corresponding to the navigation content.

The sending module 51 is further configured to send template version information to the server;

the receiving module 52 is further configured to receive an update instruction sent by the server, and download a template patch from the server according to the update instruction;

the apparatus further includes a first update module 55 configured to update an existing template according to the template patch.

the apparatus further includes a second update module 56 configured to:

determine whether it is required to update a template according to the target template identifier, and download a template patch from the server if necessary;

update the existing template according to the template patch.

The specific implementation principle and implementation of the apparatus for implementing the voice application provided in the present embodiment are similar to that of the embodiment shown in FIG. 2 to FIG. 2B, which will not be repeated herein.

Figure 7:
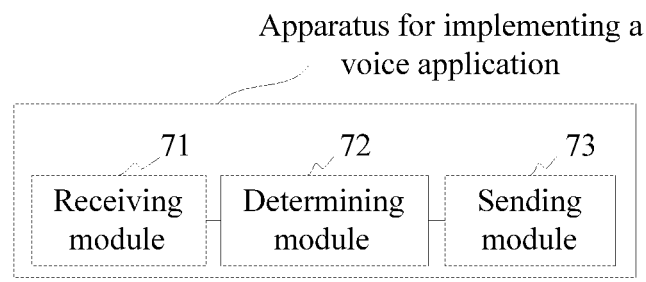
FIG. 7 is a structural diagram of an apparatus for implementing a voice application according to another exemplary embodiment of the present disclosure.

FIG. 7 is a structural diagram of an apparatus for implementing a voice application according to another exemplary embodiment of the present disclosure.

As shown in FIG. 7, the apparatus for implementing the voice application provided in the present embodiment includes:

a receiving module 71, configured to receive a voice command sent by an IoT device;

a determining module 72, configured to determine a target template identifier corresponding to the voice command based on a preset correspondence, and determine a feedback content according to the voice command;

a sending module 73, configured to send the feedback content and the target template identifier to the IoT device, so that the IoT device determines a display content to be displayed to a user according to the feedback content and the target template identifier.

The apparatus for implementing the voice application provided in the embodiment includes: a receiving module, configured to receive a voice command sent by a IoT device; a determining module, configured to determine a target template identifier corresponding to the voice command based on a preset correspondence, and determine a feedback content according to the voice command; a sending module, configured to send the feedback content and the target template identifier to the IoT device, so that the IoT device determines a display content to be displayed to the user according to the feedback content and the target template identifier. The apparatus for implementing the voice application provided in the embodiment determines the feedback content and the template identifier corresponding to a voice command of a user on a server side, and the determination result is performed by the IoT device. As the Internet information is iteratively updated, the voice command is also updated, the processing function for the voice command can be updated on a server side, so that the voice application in the IoT device does not need to be updated. Therefore, using the apparatus for implementing the voice application provided in the present embodiment, the processing capability of the voice application can be updated without upgrading the voice application itself, thereby alleviating the problem of an excessively long upgrade process due to the OTA upgrade process in the prior art.

The specific principle and implementation of the apparatus for implementing the voice application provided in the present embodiment are similar to that of the embodiment shown in FIG. 3, which will not be repeated herein.

Figure 8:
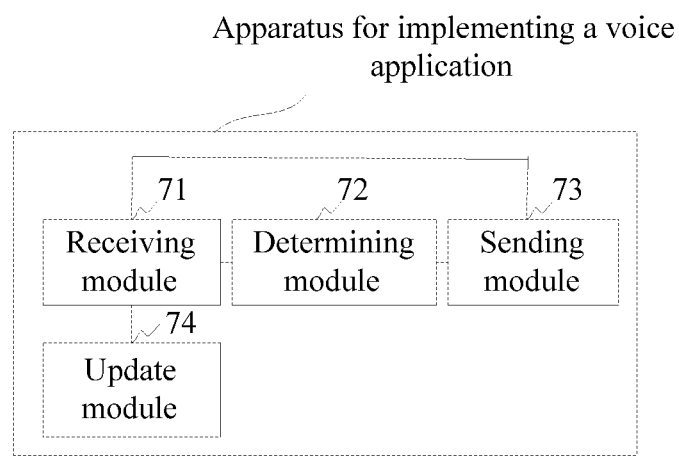
FIG. 8 is a structural diagram of an apparatus for implementing a voice application according to another exemplary embodiment of the present disclosure.

FIG. 8 is a structural diagram of an apparatus for implementing a voice application according to still another exemplary embodiment of the present disclosure.

As shown in FIG. 8, on the basis of the embodiment shown in FIG. 7, in the apparatus for implementing the voice application provided in the present embodiment, optionally, the feedback content includes at least one of the following:

a text content, a picture content, an audio content or a navigation content.

The receiving module 71 is further configured to receive template version information sent by the IoT device;

the determining module 72 is further configured to determine, according to the template version information, whether it is required to update a template in the IoT device, and if so, the sending module 73 sends an update instruction to the IoT device, so that the IoT device downloads a template patch from the server according to the update instruction.

Optionally, the receiving module 71 is further configured to receive an update request of the IoT device, where the update request is determined by the IoT device according to the target template identifier;

the sending module 73 is further configured to provide a template patch to the IoT device according to the update request, so that the IoT device downloads the template patch.

Optionally, the determining module 72 is specifically configured to:

determine a semantic category according to the voice command, and determine the target template identifier corresponding to the semantic category according to the preset correspondence.

Optionally, the receiving module 71 is further configured to receive a relationship update instruction;

the apparatus further includes an update module 74 that is configured to update the preset correspondence according to the relationship update instruction.

The specific principle and implementation of the apparatus for implementing the voice application provided in the present embodiment are similar to that of the embodiment shown in FIG. 4 to FIG. 4B, which will not be repeated herein.

Figure 9:
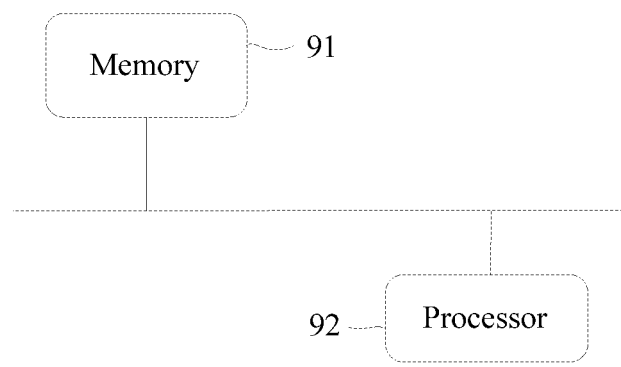
FIG. 9 is a structural diagram of a device for implementing a voice application according to an exemplary embodiment of the present disclosure.

FIG. 9 is a structural diagram of an apparatus for implementing a voice application according to an exemplary embodiment of the present disclosure.

As shown in FIG. 9, the apparatus for implementing the voice application provided in the present embodiment includes:

a memory 91;

a processor 92; and a computer program;

the computer program is stored in the memory 91 and configured to be executed by the processor 92 to implement the method for implementing the voice application of any one of FIG. 1 to FIG. 4B.

The present embodiment further provides a computer readable storage medium having a computer program stored thereon.

The computer program is executed by a processor to implement the method for implementing the voice application of any one of FIG. 1 to FIG. 4B.

One of ordinary skill in the art will appreciate that all or part of the steps to implement the method embodiments described above may be accomplished by hardware related to the program instructions. The foregoing program may be stored in a computer readable storage medium. The program, when executed, performs the steps in the foregoing method embodiments. And the foregoing storage medium includes various media that can store program codes, such as a ROM, a RAM, a magnetic disk, or an optical disk.

Finally, it should be noted that the above embodiments are merely used to illustrate the technical solutions of the present disclosure, rather than limiting them. Although the present disclosure has been described in detail with reference to the above embodiments, those skilled in the art should understand that the technical solutions described in the foregoing embodiments may be modified, or some or all of the technical features may be equivalently substituted; and the modifications or substitutions do not deviate the essence of the corresponding technical solutions from the scope of the technical solutions of the embodiments of the present disclosure.

What is claimed is:

1. A method for implementing a voice application, comprising:

sending, by an Internet of Things (IoT) device, a voice command of a user to a server;

receiving, by the IoT device, a feedback content and a target template identifier that are determined according to the voice command and sent by the server;

determining, by the IoT device, a target template from a template library according to the target template identifier, and combining, by the IoT device, the feedback content with the target template to obtain a display content, wherein the template library is set in the IoT device; and displaying, by the IoT device, the display content to the user;

wherein the feedback content comprises at least one of the following: a text content, a picture content, an audio content or a navigation content, and if the feedback content comprises at least one of the text content or the picture content, the displaying, by the IoT device, the display content to the user comprises: invoking, by the IoT device, a display interface to cause a display component of the IoT device to display at least one of the text content or the picture content;

if the feedback content comprises the audio content, the displaying, by the IoT device, the display content to the user comprises: invoking, by the IoT device, an audio interface to cause a speaker component of the IoT device to play the audio content;

if the feedback content comprises the navigation content, the displaying, by the IoT device, the display content to the user comprises: invoking, by the IoT device, a navigation interface to cause a navigation component of the IoT device to display a route corresponding to the navigation content.

2. The method according to claim 1, wherein the target template comprises a generic template in a Html5 format.

3. The method according to claim 1, wherein the combining, by the IoT device, the feedback content with the target template to obtain the display content, comprises:
determining typesetting information in the target template, and combining the feedback content with the target template according to the typesetting information to obtain the display content.

4. The method according to claim 1, wherein the method further comprises:
sending, by the IoT device, template version information to the server;
receiving, by the IoT device, an update instruction sent by the server, and downloading, by the IoT device, a template patch from the server according to the update instruction; and
updating, by the IoT device, an existing template according to the template patch.

5. The method according to claim 1, wherein after the receiving, by the IoT device, a feedback content and a target template identifier that are determined according to the voice command and sent by the server, the method further comprises:
determining, by the IoT device, whether it is required to update a template according to the target template identifier, and downloading, by the IoT device, a template patch from the server if necessary; and
updating, by the IoT device, the template according to the template patch.

6. A device for implementing a voice application, comprising:
a non-transitory computer-readable memory;
a processor; and
a computer program;
wherein the computer program is stored in the non-transitory computer readable medium and when executed by the processor, causes the processor to:
send a voice command of a user to a server;
receive a feedback content and a target template identifier that are determined according to the voice command and sent by the server;
determine a target template from a template library according to the target template identifier, and combine the feedback content with the target template to obtain a display content, wherein the template library is set in the IoT device; and
display the display content to the user;
wherein the feedback content comprises at least one of the following: a text content, a picture content, an audio content or a navigation content, and the computer program further causes the processor to:
invoke a display interface to cause a display component of the device to display at least one of the text content or the picture content if the feedback content comprises at least one of the text content or the picture content;
invoke an audio interface to cause a speaker component of the device to play the audio content if the feedback content comprises the audio content;
invoke a navigation interface to cause a navigation component of the device to display a route corresponding to the navigation content if the feedback content comprises the navigation content.

7. The device according to claim 6, wherein the target template comprises a generic template in a Html5 format.

8. The device according to claim 6, wherein the computer program further causes the processor to:
determine typesetting information in the target template, and combine the feedback content with the target template according to the typesetting information to obtain the display content.

9. The device according to claim 6, wherein the computer program further causes the processor to:
send template version information to the server;
receive an update instruction sent by the server, and download a template patch from the server according to the update instruction; and
update an existing template according to the template patch.

10. The device according to claim 6, wherein the computer program further causes the processor to:
determine whether it is required to update a template according to the target template identifier, and download a template patch from the server if necessary; and
update an existing template according to the template patch.

* * * * *